Feb. 14, 1956  L. E. KANE  2,734,840
CERAMIC DECALCOMANIA AND METHOD OF MAKING SAME
Filed Oct. 1, 1952

- Protective coating
- Powdered L.m.p. Glass
- Pigment
- Gum
- Paper back

- Low melting pt. Glass
- Pigment
- Glaze
- Body

INVENTOR.
Laurence E. Kane
BY
Munn, Liddy & Nathanson
Attorneys

United States Patent Office 2,734,840
Patented Feb. 14, 1956

2,734,840

CERAMIC DECALCOMANIA AND METHOD OF MAKING SAME

Laurence E. Kane, Mount Vernon, N. Y., assignor to Commercial Decal, Inc., Mount Vernon, N. Y., a corporation of New York Application October 1, 1952, Serial No. 312,553

7 Claims. (Cl. 154—99)

The present invention relates to a novel lithographic ceramic decalcomania, hereinafter referred to as a decal, and a method therefor.

More particularly, this invention relates to a lithographic ceramic decal wherein a protective layer of low melting glass is applied over the pigment of the decal and thereafter the decal is transferred onto a glazed ceramic surface and the low melting glass is fused by the application of heat sufficient to melt the powdered glass but less than that required for the original glaze on the ceramic surface. This results in a protective barrier over the surface of the pigment which protective barrier, being glass, is resistant to both alkalis and acids, as well as to mechanical abrasion. Moreover, since this layer is transparent the design and colors of the finished decal will appear as clearly as if no glass barrier were present. The novel decal may be used on any article including articles having a ceramic glazed coating, such as pottery, enameled metal, or glassware.

With the advent of modern chemical detergents and mechanical washing devices it is essential that the pigments of ceramic decals be protected from chemical and mechanical attack. That is, if the pigment were not protected it would fade, be abraded, and in many cases rub off.

A number of different types of decals are used at present in the pottery industry to apply patterns to ceramic wares. One of these is the so-called "underglaze" decal. As soon as the ware has been formed and before the ware is glazed, this type of decal is applied to the ware. After the decal has been applied to the ware, a glaze is applied to the ware and decal. This glaze consists of a vitreous coating which is formed directly from raw materials. Since it is formed directly from the raw materials a very high temperature must be used in firing the ware to form the glass. The result of this process is a protective coating over the pigment such that the pigment will not be subject to chemical and mechanical attack. However, the use of such a high temperature as is necessary to form the glaze destroys the color value of many of the pigments it would be necessary to use to produce the desired colors. In addition the glaze is generally somewhat opaque so that the designs of the decal are obscured. Therefore, this underglaze ceramic decal is limited in application.

As a result of these limitations, the so-called "overglaze" decals were developed. That is, decals which are applied to the ware after the high temperature glaze has been put on. These overglaze decals can generally be divided into two classes—silk screen decals and lithographic decals.

In the silk screen process a silk screen template or stencil is placed over the surface on which pigment is to be deposited and the pigment applied through the screen. If the decal were of the "water mount" or "slide off" type, the surface on which the pigment is applied would be the layer of water soluble gum which has been placed over a paper backing. In this process a relatively thick layer of pigment is deposited over the entire surface covered by the stencil. In order to increase the permanence of the design in the silk screen decal a quantity of powdered low melting point glass may be mixed with the pigment so that when the pattern is set by the application of heat this powdered glass will fuse and become a part of the pattern itself. The silk screen decals, however, like the underglaze decals, are subject to a number of limitations. First, the fine and clear cut designs available in the lithographic process cannot be obtained by the silk screen process. In addition, when the powdered low melting glass is mixed with the pigment and fused, some colors (for example, selenium red) are dissolved when they come into contact with the molten glass—throughout the mixture. Therefore the number of pigments which can be used is limited. The thicker pattern which results from this process is not always desirable. Because of these limitations lithographic decals are widely used in the industry.

Lithographic decals are formed by printing the desired pattern on the decal by a lithographic process. In the case of the water-mount decals the pattern is printed on the top of the water soluble gum layer. As is the case with other types of decal it is essential that the pigment of lithographic decals be protected from the chemical and mechanical attack previously referred to. If it is not, the design loses its lustre and brightness and the pigment may rub off with handling. The obvious solution to this problem would seem to be a mixture of powdered low melting glass with the pigments as in the silk screen process. There are a number of reasons why this cannot be done. As stated previously, in the case of the mixture, the number of pigments which could be used is limited since some are attacked by molten glass. In the lithographic process the thickness of the layer, and therefore the amount of pigment which can be applied is limited by the nature of the process itself. In addition, only about half the surface area of the decal surface is covered by the pigment dots in this process and so a higher concentration of pigment must be used. Therefore, if sufficient powdered glass to protect were mixed with the pigment in this process, the pigment would be so diluted that the color value would be seriously impaired or completely destroyed.

Applicant has invented a novel lithographic ceramic decal and method therefor, which overcomes these difficulties and provides a lithographic decal which is strongly resistant to such chemical and mechanical attacks.

The principal object of this invention is to provide a lithographic decal for ceramic ware which is resistant to chemical and mechanical attacks when the ware is immersed in detergent solutions or exposed to extremes of high temperature waters and mechanical agitation.

Another object of this invention is the provision of a decal having a coating of powdered glass material, which coating fuses to form a glass layer or barrier over the surface of the decal after it has been applied to the glaze ware and sufficient heat applied to fuse the powdered glass.

Other objects and advantages of the present invention will become more apparent as it is described below, with particular reference to the accompanying drawings wherein.

Figure 1:
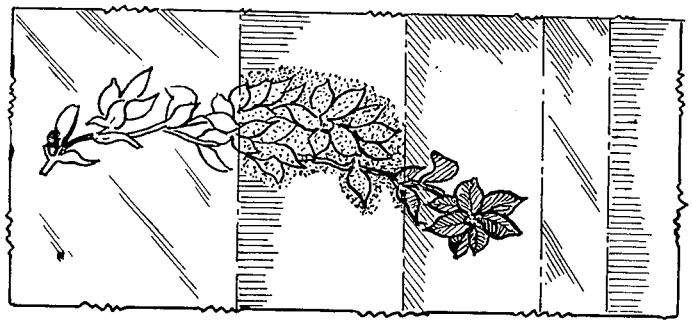
Fig. 1 is a face view of the novel decal broken away to show the layers of material of which it is composed.
Figure 2:
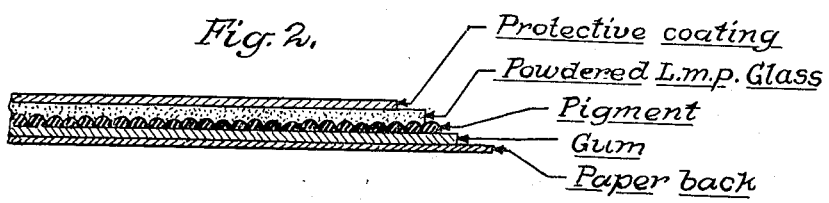
Fig. 2 is a sectional view of the decal.

Referring particularly to Figs. 1 and 2 there is shown the novel decal which is composed of a number of layers of material in the order in which they are applied. As in the ordinary lithographic decal there is a layer of paper backing, a water soluble gum layer, and a pigment layer forming the pattern. It should be noted that this color or pigment as purchased has a limited quantity of powdered glass therein to act as a bonding agent. It is not, however, of sufficient quantity to protect the pigment. In my novel decal this pigment layer is then covered with a layer of powdered low melting point glass. A final supporting and protecting layer is disposed over the entire decal. This layer may be varnish, lacquer, or some similar substance. This layer serves to protect the decal sheet during storage and shipment and is volatized when heat is applied to the decal. It also aids during transfer of water mount decals in that it protects the powdered glass layer from water.

This powdered low melting point glass layer is essentially made up of powdered pre-fused lead boro-silicate glass which also may contain increments of lithium oxide, aluminum oxide, cadmium oxide, sodium oxide, potassium oxide, zirconium oxide, titanium dioxide, calcium oxide or magnesium oxide, either alone or in combination. The relative proportion of oxides used in the glass powder is determined primarily by the inertness and compatibility of the pigment with the glass. That is, if the pigment contained, for example, aluminimum oxide, and the powdered glass layer were deficient in this oxide it would have a tendency to "rob" this oxide from the pigment when the ware was fired. Therefore this oxide is added to the glass powder to forestall this contingency. The oxide is an integral part of the glass when initially fused, and not a later addition.

This layer of powdered low melting point glass may be applied, for example, to the pigment by either of the methods hereinafter described. By one method, a layer of varnish may be applied by a lithographic process to the areas it is desired to protect and the powdered glass then dusted on. This procedure could be repeated until a layer of desired thickness has been built up.

Another method which may be used is to suspend the powdered glass in one of the various commonly known screening media. The contents of this paste may vary between 60 to 80% by weight of powdered glass and 40 to 20% by weight of the liquid vehicle. This paste may then be applied over the desired area by means of a silk or metal screening fabric acting as a stencil. By this method the area of application is easily controlled.

Figure 3:
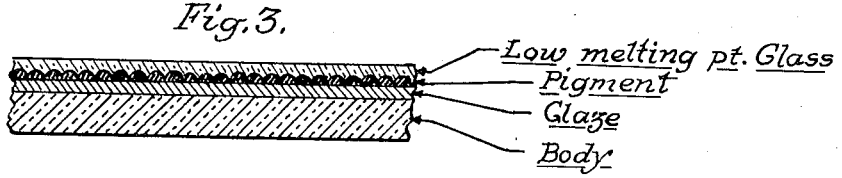
Fig. 3 is a cross-sectional view of the decal after it has been transferred to the ware and the ware has been fired.

Once the decal is complete, it is transferred to the article of pottery in the usual manner. That is, the decal is placed on the ware in the wet condition and the paper removed by sliding it from under the decal. The article is then fired at a relatively low temperature and the powdered glass fused so as to form an integral part of the plate and provide a glass layer to protect the pigment from chemical or mechanical action. A relatively low temperature can be used since the layer of glass powder is made up of prefused glass which will melt at much lower temperature than is required to fuse the raw materials from which the glaze on the ceramic ware itself is formed. The usual firing temperature required for this operation is between 1000° F. and 1500° F. It should be particularly noted at this point that this low temperature unlike the high temperatures used in applying the glaze to the entire plate, does not operate to destroy or impair the color values of the pigments used. In this decal as in all overglaze decals the glaze is applied before the decal is transferred to the plate, and thus the decal is not subject to high temperatures. But in this case to protect the decal and provide a permanent design a pre-fused low melting point glass is used over the pigments. The pigment is protected in much the same manner as the underglazed decals and yet the color values are not impaired by the application of very high temperatures such as are required in applying glaze. Pigments of the type which are affected by contact with molten glass are affected in this case at the surface only and not sufficiently to impair color value of decal. Since the pigment is dry when the powdered glass layer is applied the powdered glass will not sink into the pigment so as to affect the pigment throughout as in the mixture used in the silk screen process. The pigment of the ordinary decal is formed of a series of hemispheric globules. This is roughly shown in Figs. 2 and 3. Because of this hemispherical configuration the pigment in the usual lithographic decal presents an area subject to chemical attack which is six times the plane surface area presented by the improved decal. That is, in addition to providing the mechanical barrier, the possible area which would be subject to chemical and mechanical attack is substantially reduced.

It is from the foregoing description that applicant has provided a novel and improved lithographic ceramic decal which is not subject to the chemical and mechanical deterioration of presently used lithographic decals. This novel decal prevents the true color of the decal from being destroyed and greatly enhances the commercial value of the article.

While the invention has been shown and described in the preferred form, it is obvious that many changes and modifications may be made without departing from the spirit of the invention as defined in the following claims.

I claim:

1. An overglaze water-mount decalcomania adapted to be applied to a vitreous surface comprising a base sheet, a liquid soluble adhesive disposed on said base sheet, a pigment pattern disposed on said liquid soluble adhesive providing a configuration which is to appear on the vitreous surface, a layer of powdered low melting point glass containing increments of at least one metallic oxide disposed over said pattern, and a coating engaging said layer of powdered low melting point glass retaining the same substantially in its original layer form whereby after the decalcomania is applied to the vitreous surface and the assemblage fired, the layer of low melting point glass will be fused and form a contiguous, durable, protective coating on the surface overlying the said pigment pattern.

2. The invention as defined in claim 1 in which the metallic oxide is cadmium oxide.

3. The invention as defined in claim 1 in which the metallic oxide is lithium oxide.

4. The invention as defined in claim 1 in which the metallic oxide is sodium oxide.

5. The invention as defined in claim 1 in which the metallic oxide is calcium oxide.

6. The invention as defined in claim 1 in which the metallic oxide is magnesium oxide.

7. The method of making an overglaze water-mount decalcomania which is resistant to chemical and mechanical deterioration which includes the steps of applying a coating of liquid soluble adhesive to a base sheet, printing a pigment pattern thereover, applying a covering of powdered low melting point glass containing increments of at least one metallic oxide over said pattern, and applying a coating over said powdered low melting point glass whereby after the decalcomania is applied to a vitreous surface and the assemblage fired, the layer of powdered low melting point glass will be fused to form a contiguous, durable, protective coating on the article overlying the said pigment pattern.

References Cited in the file of this patent

UNITED STATES PATENTS

| Number | Name | Date |
|---|---|---|
| 1,795,200 | Crossley | Mar. 3, 1931 |
| 1,998,638 | Reese | Apr. 23, 1935 |
| 2,419,918 | Scheetz | Apr. 29, 1947 |
| 2,461,878 | Christensen et al. | Feb. 15, 1949 |
| 2,476,570 | Van Horn et al. | July 19, 1949 |
| 2,629,679 | Rathke | Feb. 24, 1953 |